US005718321A

United States Patent [19]

Brugger et al.

[11] Patent Number: 5,718,321

[45] Date of Patent: Feb. 17, 1998

[54] SORTING APPARATUS FOR MAIL AND THE LIKE

[75] Inventors: Rudolf Brugger, Puchheim; Rudolf Schuster, Kirchheim; Adolf Höpler, München; Wilfried Lange, Garching; Volkmar Schulz, Schwarzenbruck; Werner von Hacht, Uttenreuth, all of Germany

[73] Assignee: Siemens Aktiengesellschaft, Munich, Germany

[21] Appl. No.: 581,586

[22] PCT Filed: Jul. 7, 1994

[86] PCT No.: PCT/DE94/00779

§ 371 Date: Jan. 16, 1996

§ 102(e) Date: Jan. 16, 1996

[87] PCT Pub. No.: WO95/02467

PCT Pub. Date: Jan. 26, 1995

[30] Foreign Application Priority Data

| | | | |
|---|---|---|---|
| Jul. 14, 1993 | [DE] | Germany | 43 23 564.6 |
| Jul. 14, 1993 | [DE] | Germany | 43 23 565.4 |
| Jun. 23, 1994 | [DE] | Germany | 44 22 067.7 |

[51] Int. Cl.$^6$ .................... B65G 37/00

[52] U.S. Cl. .................... 198/359; 209/900

[58] Field of Search .................... 198/358, 359, 198/363, 364.2, 550.01, 550.2; 209/900, 912, 914, 698

[56] References Cited

U.S. PATENT DOCUMENTS

| | | | |
|---|---|---|---|
| 3,300,026 | 1/1967 | Lens et al. . | |
| 4,310,276 | 1/1982 | Castagnoli . | |
| 4,635,787 | 1/1987 | Thake | 209/900 X |
| 4,688,678 | 8/1987 | Zue et al. | 209/900 X |
| 5,096,047 | 3/1992 | Morikiyo et al. . | |
| 5,109,987 | 5/1992 | Daboub et al. | 209/900 X |
| 5,195,641 | 3/1993 | Signoretto | 209/900 X |
| 5,293,983 | 3/1994 | Grapes et al. | 198/358 |
| 5,419,457 | 5/1995 | Ross et al. | 209/900 X |
| 5,535,874 | 7/1996 | Ross et al. | 209/900 X |

FOREIGN PATENT DOCUMENTS

| | | | |
|---|---|---|---|
| 2 454 338 | 11/1980 | France . | |
| 6144517 | 5/1994 | Japan | 198/359 |
| WO 95/02467 | 1/1995 | WIPO . | |
| WO 95/17267 | 6/1995 | WIPO . | |

*Primary Examiner*—James R. Bidwell
*Attorney, Agent, or Firm*—Hill, Steadman & Simpson

[57] ABSTRACT

The sorting apparatus includes a plurality of conveyable-article carriers (FT) which circulate on at least one conveying device (FE) and are intended for receiving, for transporting and for discharging, in a controllable manner, the conveyable articles to sorting containers (SB), the conveyable-article carriers (FT) circulating, via at least one vertical deflection of the conveying device (FE), in at least two planes (E1, E2), and the sorting containers (SB) being provided in at least two levels (ET1, ET2) assigned to the planes (E1, E2) of the conveying device (FE). The guidance of the conveying device (FE) in at least two planes (E1, E2), and the provision of sorting containers (SB) in at least two levels (ET1, ET2) assigned to said planes (E1, E2) makes it possible, with the same surface area on which to set up the sorting apparatus, for the number of sorting containers (SB) available for sorting purposes to be doubled or multiplied.

17 Claims, 4 Drawing Sheets

SORTING APPARATUS FOR MAIL AND THE LIKE

BACKGROUND OF THE INVENTION

The machine-readable post codes which should be specified on items of post, such as letters, postcards, packets and the like, as an identification for a location, a postal district, a PO box or a major recipient permit rapid, mechanical distribution of post. In this arrangement, sorting of the incoming items of post takes place with the aid of controllable conveyable-article carriers which are each loaded, preferably mechanically, with an item of post in special input locations and then discharge said item of post to a sorting container assigned to the respective postal code. After transfer of the item of post to the associated sorting container, the empty conveyable-article carrier can then once again be loaded with an item of post when it passes an input location.

U.S. Pat. No. 3,300,026 discloses a sorting apparatus for mail, which exhibits conveyable-article carriers which circulate in pairs on a conveying device and are intended for receiving, for transporting and for discharging, in a controllable manner, the mail to sorting containers. The conveying device comprises two chains which circulate endlessly at a spacing from one another, are guided in meandering fashion over corresponding rollers, and guide the conveyable-article carriers, in a plurality of planes located one above the other, along a row with sorting containers in each case. The meandering routing of the conveying device in a plurality of planes means that the sorting apparatus gives a relatively large overall height with correspondingly poor accessibility to the sorting containers arranged in the upper planes.

French Patent Document 24 54 338 discloses a sorting apparatus for mail, which exhibits a plurality of conveyable-article carriers which circulate on a conveying device and are intended for receiving, for transporting and for discharging, in a controllable manner, the mail to sorting containers. The conveyable-article carriers are fastened in pairs opposite one another on circulating transporting gondolas of the conveying device, the transporting gondolas, which are driven for example by an endless chain, being guided, by rollers, on a vertically aligned rail extending in the transporting direction. In the region of two adjacent, U-shaped deflections of the conveying device, the transporting gondolas are guided along a total of four parallel double rows with sorting containers, it being possible for the mail to be ejected from the conveyable-article carriers into said sorting containers. Due to the fact that the sorting containers are set up in four double rows and due to the interspaces required for the access of operating staff, a very large surface area is required in order to set up the entire sorting apparatus.

SUMMARY OF THE INVENTION

The present invention provides an improved sorting apparatus for mail and the like. The sorting apparatus according to the present invention has a plurality of conveyable-article carriers which circulate on at least one conveying device and which are adapted for receiving, transporting and discharging, in a selective and controllable manner, articles to selected sorting containers. The conveyable-article carriers movably circulate through at least two planes, via at least one vertical deflection of the conveying device that carries the carriers between the planes. The sorting containers are positioned in at least two levels corresponding to at least two predefined operating planes of the conveying device. Also, the conveyable-article carriers in each plane are guided along in two rows, spaced apart from one another in the corresponding level with sorting containers. This arrangement permits use of a multiplicity of sorting containers within a confined space.

As used herein, the term “sorting container” includes any suitable compartment for receiving the sorted conveyable articles. Specifically, such sorting containers may be boxes, bags, or the compartments of a rack storage system.

Besides sorting and distributing mail in public post offices or central in-house mail departments large companies, a sorting apparatus according to the invention may also be used for comparable tasks, for example, in storage systems or automated order-picking systems, in the case of which goods or parts provided with codings are fed to sorting containers assigned to the respective codings.

The invention is based on the finding that, by virtue of at least one vertical deflection of the conveying device, the conveyable-article carriers can circulate in two or more planes and thus the sorting containers may also be provided in at least two levels assigned to the planes. In this arrangement, the conveyable-article carriers, in each plane, are guided along in each case two rows, spaced apart from one another in the assigned level, with sorting containers. It is thus possible, with a small surface area on which to set up the sorting apparatus, for a very large number of sorting containers provided for sorting purposes to be provided. Routing the conveying device over two or more planes, the routing being needed in order to increase the sorting capacity, requires a relatively low degree of additional outlay, especially since the vertical deflections can be realized in a simple manner and a single drive system can be maintained. The compact and clearly laid out arrangement of the sorting containers in two or more levels also facilitates the work of the staff required to exchange full sorting containers. Since the two rows of sorting containers of one level are each accessible from different sides, high ease of operation is ensured.

The preferred configuration of the conveyable-article carriers is based on the finding that conveyable-article carriers comprising a fixedly arranged wall part and a movable wall part, in the closed position, the carriers can also reliably receive conveyable articles which are difficult to handle, e.g. thin letters. In the discharging position, the carriers permit a reliably controllable transfer of the conveyable articles to an associated sorting container. In this arrangement, it is not necessary to stop or slow down the conveyable-article carriers during transfer of the conveyable articles.

An advantage of the present invention is to permit particularly simple pivoting of the movable wall part between the closed position and discharging position of the conveyable-article carrier.

Another advantage of the present invention is to by way of the secured closed position, particularly secure transportation of the conveyable articles. On the other hand, only a minimum degree of outlay is required for the discharging position to be reliably assumed.

A further advantage of the present invention is to allow various types and sizes of conveyable article to be reliably received, considerable reinforcement of the wall parts being achieved, at the same time, by the curving.

An additional advantage of the present invention is to provide particularly secure transportation of the conveyable articles since the interlocking toothing arrangement prevents thin letters or the like from falling out even when the carrier is not fully closed.

A still further advantage of the present invention is to provide a further reinforcement of the wall parts, the undulating design, at the same time, preventing thin letters or the like from sticking in an undesired manner on the wall parts of the conveyable-article carrier.

Yet another advantage of the present invention is to provide a particularly reliable approach to the sorting container assigned to the respective conveyable articles. The inclination of the ejection chute and the speed of the conveyable-article carrier may, in this arrangement, be matched to one another such that even a vertical ejection of thin letters can be achieved. The ejection chute is formed preferably by the movable wall part. The center of gravity of the movable wall part is, in this arrangement, displaced downwards, as a result of which automatic pivoting from the closed position into the discharging position can be carried out without additional actuating means.

In an embodiment, the present invention simplifies transportation of the conveyable-article carriers. If the conveyable-article carriers are arranged such that they project laterally on a circulating transporting carriage, then the conveyable-article carriers may also be guided through between two rows, arranged at a relatively small vertical spacing with respect to one another, of sorting containers. Preferably two or more conveyable-article carriers are fastened on the transporting carriages, this resulting in a further reduction in structural outlay for the entire conveying device.

An embodiment of the present invention permits, with a minimal degree of structural outlay, reliable guidance of the transporting carriages, use being made, as endlessly circulating transporting means preferably of a transporting cable, and the profiles, preferably being of a tubular design.

The development according to claim 16 permits a sturdy and reliable arrangement of the two profiles in the rectilinear sections of the conveying device, with the result that additional fastening means for profiles can be dispensed with over the curves and deflection regions of the conveying device.

Additional features and advantages of the present invention are described in, and will be apparent from, the detailed description of the presently preferred embodiments and from the drawings.

BRIEF DESCRIPTION OF THE DRAWINGS

An exemplary embodiment of the invention is described in more detail hereinbelow and is represented in the drawing, in which.

DETAILED DESCRIPTION OF THE PRESENTLY PREFERRED EMBODIMENTS

Figure 1:
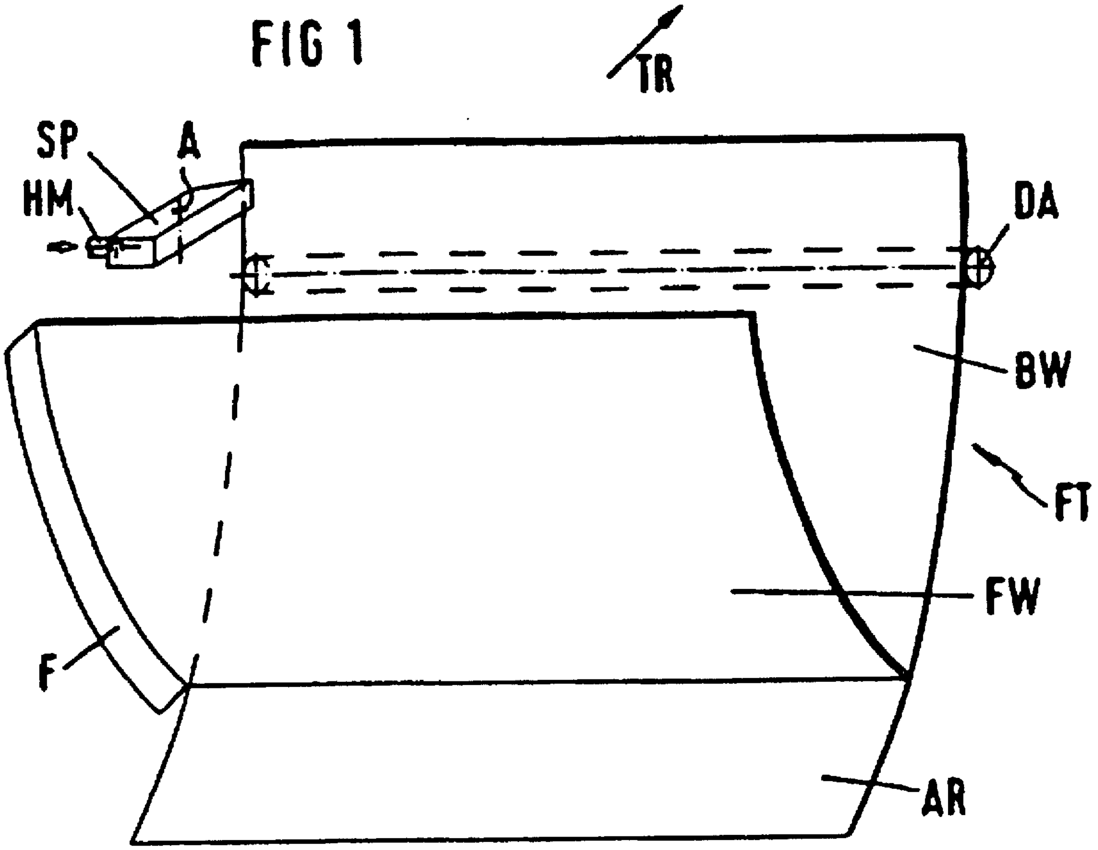
FIG. 1 is a perspective view of a conveyable-article carrier comprising a fixedly arranged wall part and a movably arranged wall part.

FIG. 1 shows a perspective representation of a conveyable-article carrier which is designated as a whole by FT and comprises a fixed wall part FW and a movable wall part BW. In this arrangement, the movable wall part BW can be pivoted about a pivot pin DA aligned transversely with respect to the transporting direction TR of the conveyable-article carrier FT.

Figure 2:
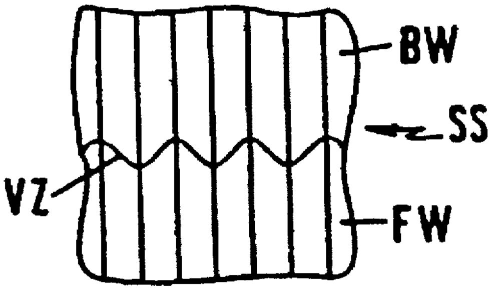
FIG. 2 is a fragmentary view of the toothing arrangement of the two wall parts, represented in FIG. 1, in the closed position of the conveyable-article carrier.

FIG. 1 shows the closed position of the conveyable-article carrier FT, in which the fixed wall part FW and the movably arranged wall part BW, each of which are curved outwards, form a cross-sectionally approximately V-shaped receiving pocket for conveyable articles. According to FIG. 2, the two wall parts FW and BW are each bent in undulating fashion, and in the closed position SS represented in plan view from above, the two wall parts FW and BW interlock by way of a toothing arrangement VZ. The closed position SS is secured according to FIG. 1 by a lock SP which is designed as a detent pawl, can be rotated about an axis designated by A and can be released by actuating a solenoid HM. If the lock SP is released, then the movable wall part BW is pivoted about the pivot pin DA such that an ejection slit, which is open at the bottom and belongs to the conveyable-article carrier FT, is formed. In this arrangement, the bottom extension of the movably arranged wall part BW forms an ejection chute AR which adjoins said ejection slit at the bottom and is inclined counter to the transporting direction TR.

Figure 3:
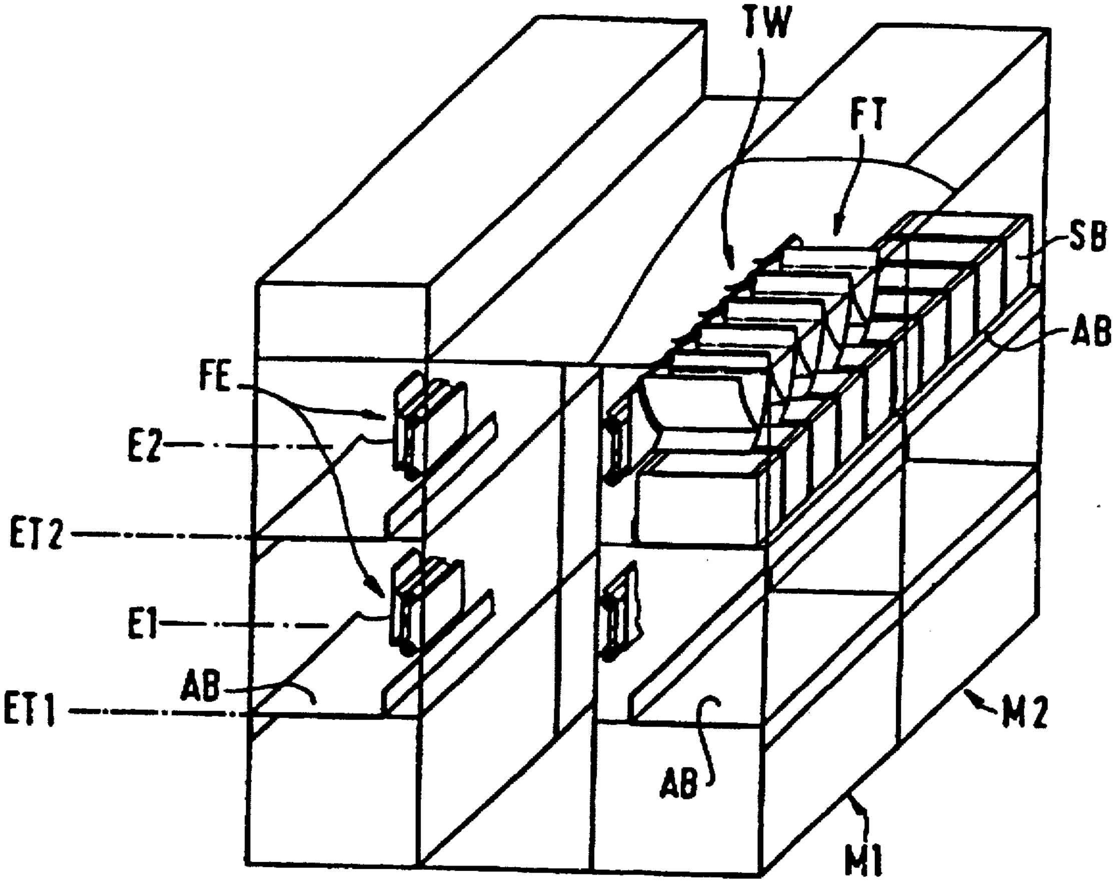
FIG. 3 is a perspective view of two modules, lined up side by side, of a sorting apparatus equipped with conveyable-article carriers according to FIG. 1, in the case of which the conveyable-article carriers circulate in two planes and the sorting containers are arranged in two levels.

FIG. 3 shows a perspective representation of two modules M1 and M2, lined up side by side, of a sorting apparatus equipped with conveyable-article carriers FT according to FIG. 1. In this arrangement, in each case a total of five conveyable-article carriers FT are fitted on one transporting carriage TW, the latter being a constituent part of a conveying device FE and circulating in two planes E1 and E2. Each module M1 and M2 has, in each plane E1 and E2, in each case two levels ET1 and ET2, which are formed by metal bearing plates AB and in which sorting containers SB can be lined up closely side by side. Only the sorting containers SB which are provided in the right-hand upper level ET2 are represented in FIG. 3. It can be seen that the conveyable-article carriers FT on the transporting carriages TW circulate above the sorting containers SB such that, upon activation of the detent pawl SP (see FIG. 1), the conveyable articles (not shown in any more detail in FIG. 3) can be ejected into a sorting container SB assigned to the respective coding.

Figure 4:
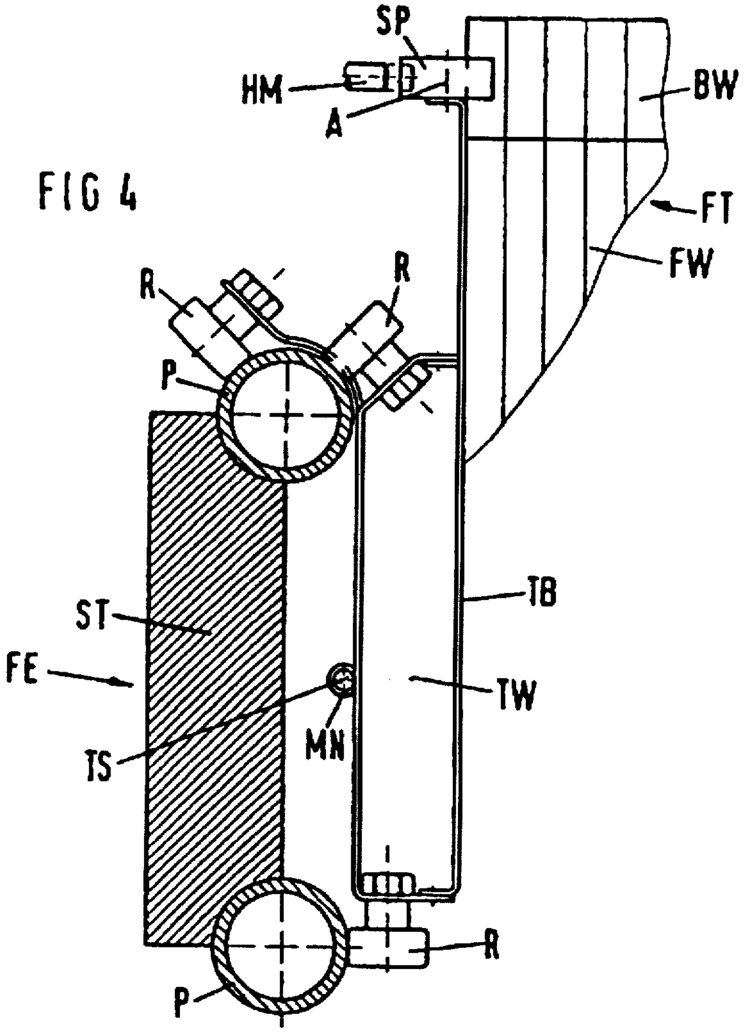
FIG. 4 shows the operating principle of the conveying device used in the sorting apparatus according to FIG. 3.

FIG. 4 shows closer details of the conveying device FE represented in FIG. 3. In the cross-section represented here, it can be seen that the transporting carriage TW is guided, via rollers designated by R, two tubular profiles P extending in the transporting direction TR (see FIG. 1). The profiles P, aligned parallel to one another at a vertical spacing, are connected to one another, in rectilinear regions of the conveying device FE, via webs ST likewise extending in the transporting direction TR, said webs ST being dispensed with in the curved regions. A transporting carriage TW is driven via an endlessly circulating transporting cable TS, on which the transporting carriage TW is fastened with the aid of a driver MN. Other endlessly circulating transporting means, e.g. a transporting chain, could also be used instead of the transporting cable TS. On the side located opposite the transporting cable TS, the transporting carriage TW has a metal supporting plate TB on which the individual conveyable-article carriers FT are fastened by the end side and which also bears the detent pawls SP and the associated solenoids HM. The metal supporting plate TB functions as a securing means for the pivot pins DA of the movable wall parts BW, while the fixed wall parts FW of the individual conveyable-article carriers FT are connected fixedly to the metal supporting plate TB via end-side flanges F (see FIG. 1).

Figure 5:
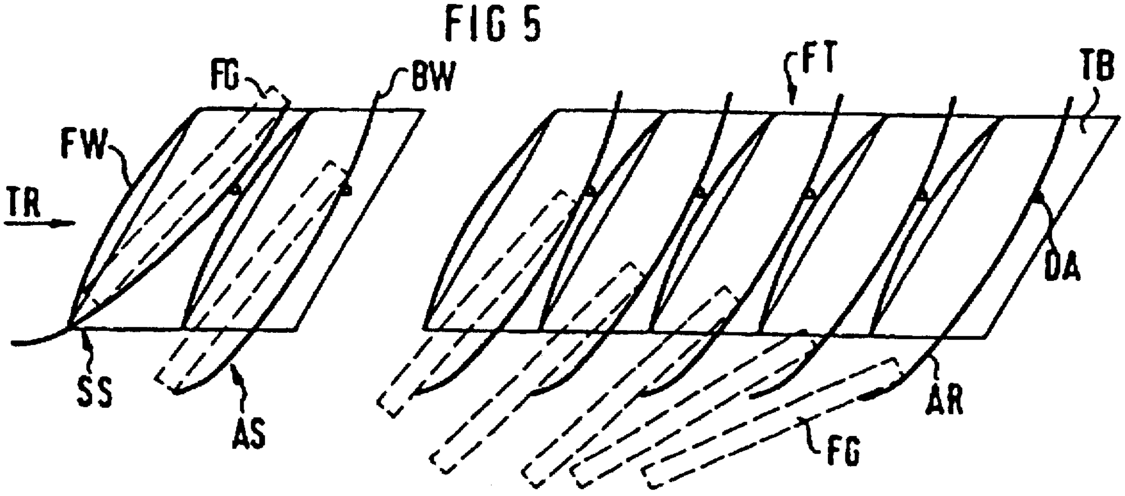
FIG. 5 is a schematic illustration of the movement sequence of the conveyable article upon ejection out of a conveyable-article carrier according to FIG. 1.

FIG. 5 shows a study of the time-independent movement sequence upon ejection of the conveyable article from the conveyable-article carriers FT according to the invention. A conveyable-article carrier FT in its closed position SS can be seen on the left-hand side of the representation shown here. The conveyable article FG represented by broken lines is intended to constitute a thin letter here.

The conveyable-article carrier FT which is second from the left is represented as already being in its discharging position AS, in which the movable wall part BW, by being pivoted about the pivot pin DA, forms, together with the fixed wall part FW, an ejection slit for the conveyable article FG. It can be seen from the following positions of the conveyable article FG that the latter slides downwards via the ejection chute AR and, in this arrangement, addition to the downwardly directed vertical movement components, achieves a horizontal movement component counter to the transporting direction TR. In this arrangement, the transporting speed in the transporting direction TR and the inclination of the ejection chute AR can be coordinated with one another such that the conveyable article FG can drop at least largely vertically downwards into an associated sorting container SB (see FIG. 3).

Figure 6:
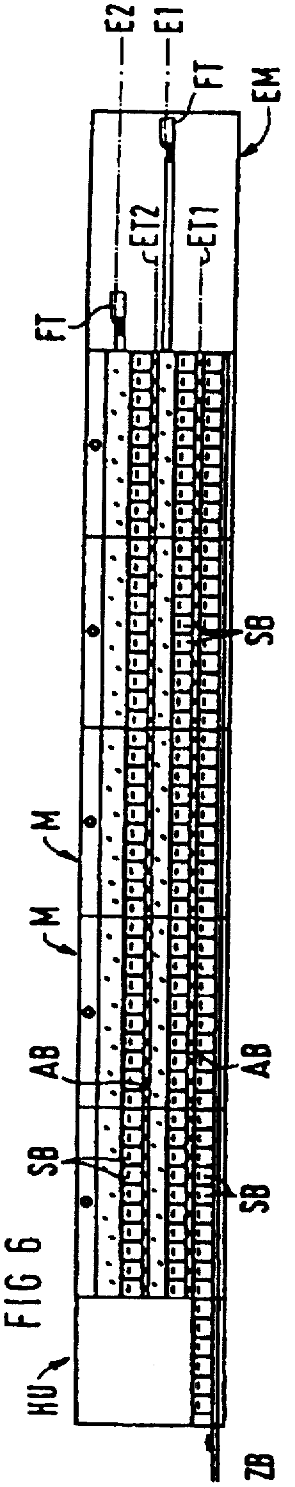
FIG. 6 is a side view of a sorting apparatus constructed from modules according to FIG. 3.
Figure 7:
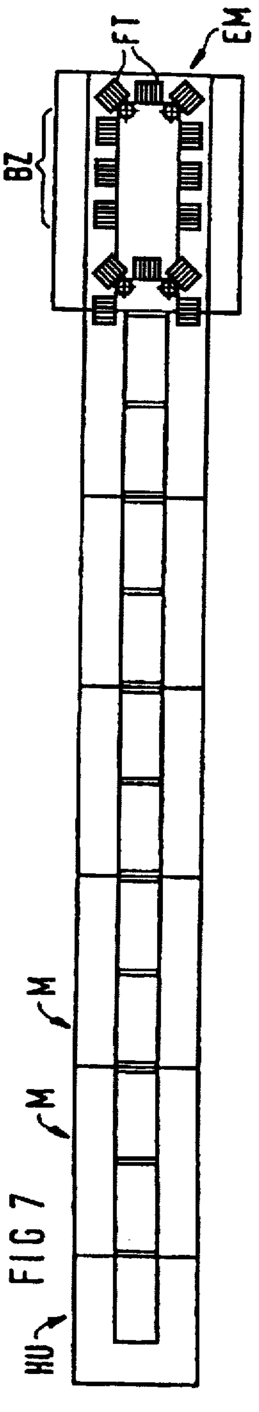
FIG. 7 is a plan view of the sorting apparatus according to FIG. 6.

FIGS. 6 and 7 show a side view and a plan view, respectively, of a sorting apparatus made up of individual modules M. In this arrangement, the individual modules M correspond to the modules M1 and M2 represented in FIG. 3, but, in FIG. 6, an additional feed belt ZB, which is arranged beneath the lower plane E1 and is intended for providing empty sorting containers SB, is also represented. Upon removal of a full sorting container SB from the lower level ET1 or the upper level ET2, the sorting container can then be replaced by an empty sorting container SB provided on the feed belt ZB.

In the representation according to FIGS. 6 and 7, a vertical deflection HU is located on the left-hand side in front of the first module M, while an end-side input module EM adjoins the last module M on the right-hand side. In the region of the input module EM, the U-shaped circulation of the conveyable-article carriers FT in the upper plane E2 is set back with respect to the U-shaped circulation of the conveyable-article carriers FT in the lower plane E1. Consequently, in the region of the input module EM, the conveyable-article carriers FT circulating in the lower plane E1 can be loaded, from above in each case, from the end side, from the front or from the rear, it being possible for loading to be carried out manually or mechanically. Indicated in FIG. 7 is a rear-side loading zone BZ, in which conveyable-article carriers FT are loaded with the aid of a transfer device (not shown in any more detail). Details of a suitable transfer device can be gathered from the Patent Application P 43 44 347.8. The transfer device described therein comprises a rotating impeller wheel, the blades of which form cells which receive the conveyable articles arriving on a conveying device and discharge them to the circulating conveyable-article carriers FT.

Figure 8:
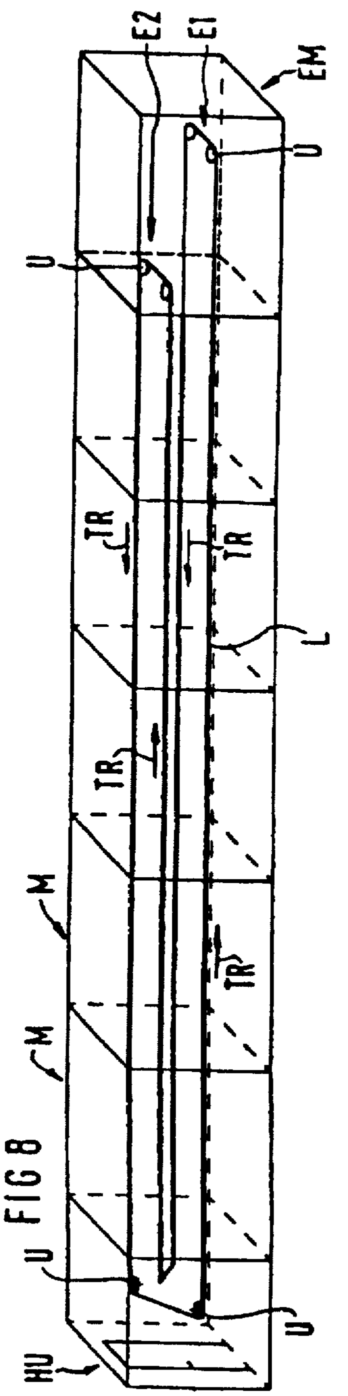
FIG. 8 is a perspective view of the guidance, over two planes, of the conveying device of the sorting apparatus represented in FIGS. 6 and 7.

FIG. 8 shows a vastly simplified schematic representation of the guidance of the conveying device FE (see FIGS. 3 and 4) over the two planes E1 and E2. The line n shows the spatial routing of the transporting cable TS (see FIG. 4), the transporting direction being indicated by arrows TR. In this arrangement, the guidance of the transporting cable TS in the region of the vertical deflection HU and in the region of the input module EM is indicated by deflection rollers U. The corresponding spatial routing, guided parallel to the line L, of the profile P (see FIG. 4) cannot be seen in FIG. 3.

The conveyable-article carriers FT loaded with conveyable articles FG in the rear loading zone BZ of the lower plane E1 (see FIG. 7) are deflected forwards at the same level in the end-side region of the input module EM and are then transported past the sorting containers SB arranged at the front in the lower level ET1. In the region of the vertical deflection HU, the conveyable-article carriers FT are then guided obliquely upwards into the upper plane E2 and, there, are transported past the sorting container SB arranged at the rear in the upper level E2. In the region of the input module EM, the conveyable-article carriers FT are then deflected forwards on the same level and are then transported past the sorting containers SB arranged at the front in the upper level ET2. In the region of the vertical deflection HU, the conveyable-article carriers FT are then guided obliquely downwards into the lower plane E1 and, there, are transported past the sorting containers SB arranged at the rear in the lower level ET1. Over the above-described transporting path, the individual conveyable-article carriers FT discharge the carried-along conveyable articles FG to an associated sorting container SB, with the result that they can then be loaded again with conveyable articles FG when they pass the rear loading zone BZ.

Although other modifications and changes may be suggested by those skilled in the art, it is the intention of the inventors to embody within the patent warranted hereon all changes and modifications as reasonably and properly come within the scope of their contribution to the art.

What is claimed is:

1. A sorting apparatus for sorting articles, the sorting apparatus comprising:

a plurality of conveyable-article carriers adapted for receiving, transporting and discharging, in a controllable manner, the articles to sorting containers; and at least one conveying device for circulating said conveyable-article carriers, the conveyable-article carriers circulating, via at least one vertical deflection of the conveying device, in at least two vertically offset planes;

wherein the sorting containers are operably positionable in at least two levels corresponding to the planes and wherein the conveyable-article carriers in each plane are guided along in two rows, spaced apart from one another in each of the corresponding levels with the sorting containers.

2. The sorting apparatus as claimed in claim 1, wherein each conveyable-article carrier comprises:

a fixed wall part; and a moveable wall part which is moveable relative to the fixed wall part between closed and discharge positions;

wherein the moveable wall part forms in the closed position, together with the fixed wall part, a cross-sectionally U-shaped or V-shaped receiving pocket for the conveyable articles and wherein the moveable wall part forms, in the discharge position, together with the fixed wall part, an ejection slit which is downwardly open and through which the conveyable articles may pass.

3. The sorting apparatus as claimed in claim 2, wherein the moveable wall part is pivotable about a pivot pin aligned generally transversely with respect to the transporting direction.

4. The sorting apparatus as claimed in claim 2, wherein the moveable wall part is retainable in the closed position by a releasable lock such that when the lock is released, the moveable wall part pivots automatically into the discharge position.

5. The sorting apparatus as claimed in claim 2, wherein the fixed wall part and the moveable wall part are each curved outwards.

6. The sorting apparatus as claimed in claim 2, wherein the fixed wall part and the moveable wall part are respectively shaped to include cooperating teeth which interlockably engage in the closed position.

7. The sorting apparatus as claimed in claim 2, wherein the fixed wall part and the moveable wall part are each formed in undulating fashion.

8. The sorting apparatus as claimed in claim 2, wherein one of the wall parts forms an ejection chute which adjoins the ejection slit at the bottom and which is inclined counter to the transporting direction.

9. The sorting apparatus as claimed in claim 8, wherein the ejection chute is formed by the movable wall part.

10. The sorting apparatus as claimed in claim 1, wherein the conveyable-article carriers are secured to circulating transporting carriages of the conveying device.

11. The sorting apparatus as claimed in claim 2, wherein the conveyable-article carriers are secured to a transporting carriage in the region of an end side of the fixed wall part and of the movable wall part.

12. The sorting apparatus as claimed in claim 10, wherein at least two conveyable-article carriers are fastened on a transporting carriage.

13. The sorting apparatus as claimed in claim 10, wherein the transporting carriages (TW) are guided, by rollers on two profiles, aligned at a vertical spacing with respect to one another and extending in the transporting direction, and which are driven by endlessly circulating transporting means.

14. The sorting apparatus as claimed in claim 13, wherein the endlessly circulating transporting means are formed by a transporting cable.

15. The sorting apparatus as claimed in claim 13, wherein the profiles are tubular.

16. The sorting apparatus as claimed in claim 13, wherein the two profiles are connected to one another in the region of rectilinear sections of the conveying device by webs extending in the transporting direction.

17. The sorting apparatus as claimed in claim 2, wherein one of the wall parts forms an ejection chute which is inclined such that an article discharged therefrom is imparted with a horizontal motion substantially cancelling a horizontal motion of the conveying device in the transporting direction so that the article drops generally vertically downward.

* * * * *